Figure 1:
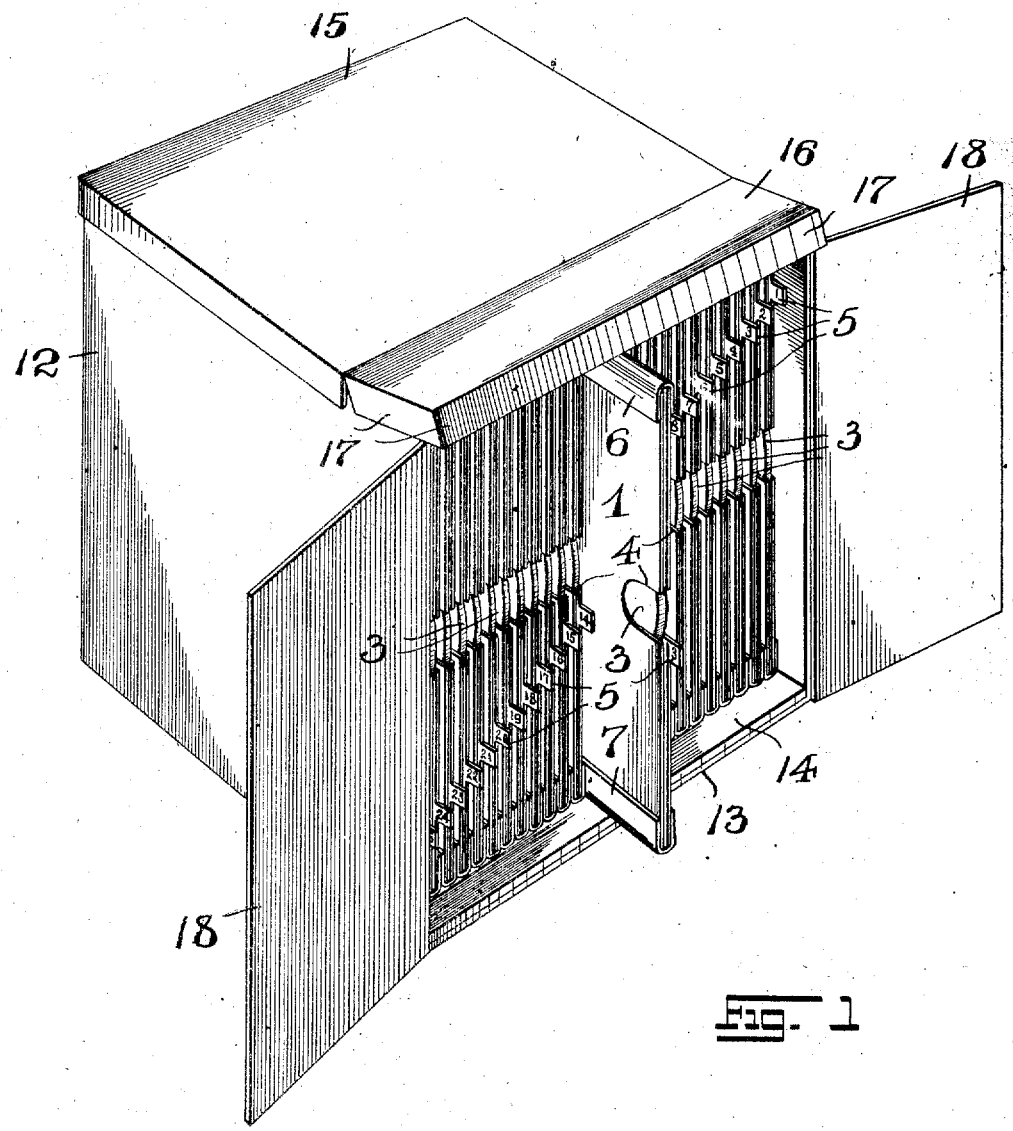

E. S. OLIVER.
FILING INCLOSURE OR CASING FOR THE RECORDS OF TALKING MACHINES.
APPLICATION FILED FEB. 5, 1910.

989,031.

Patented Apr. 11, 1911.
5 SHEETS—SHEET 1.

WITNESSES:
Fredk. H. W. Fraentzel
Anna H. Alter

INVENTOR:
Ellis S. Oliver,
BY Fraentzel and Richards,
ATTORNEYS

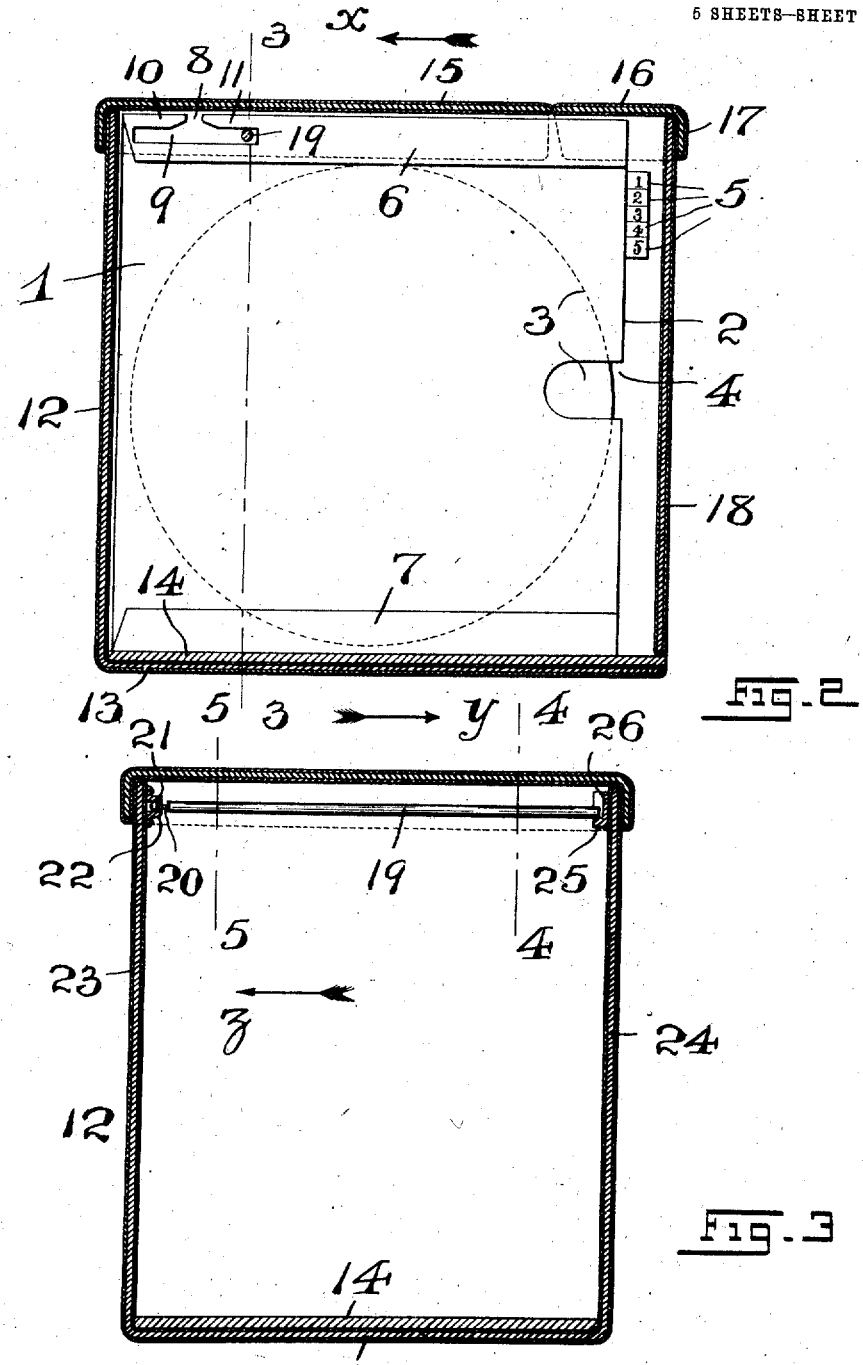

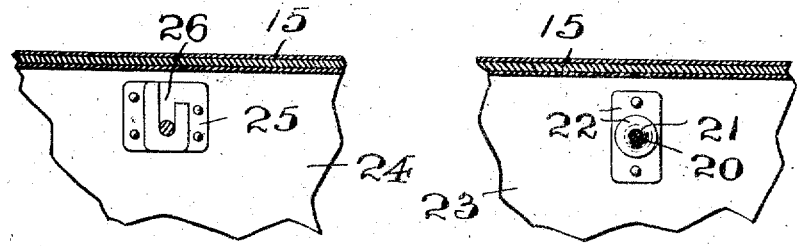
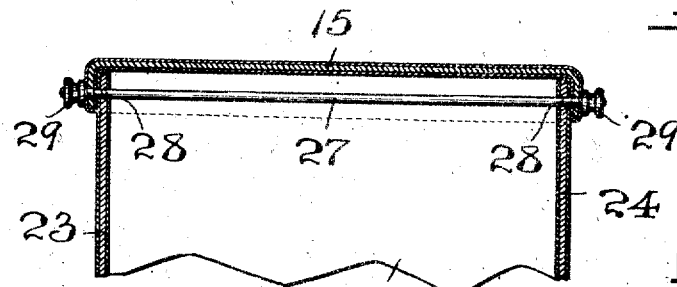
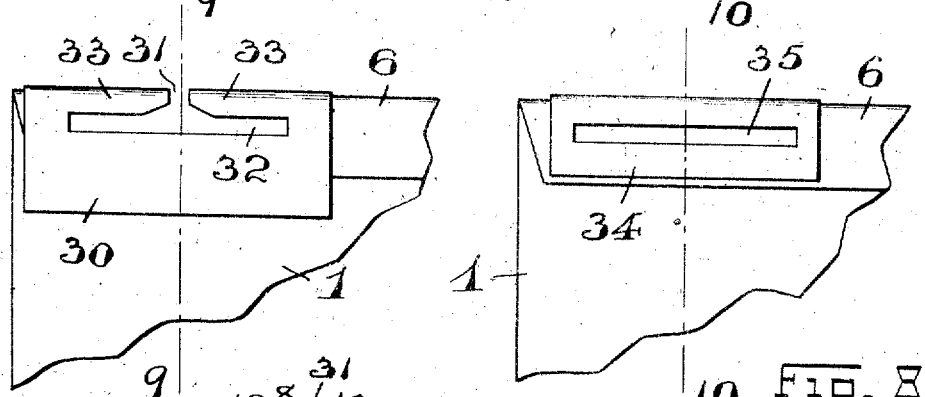
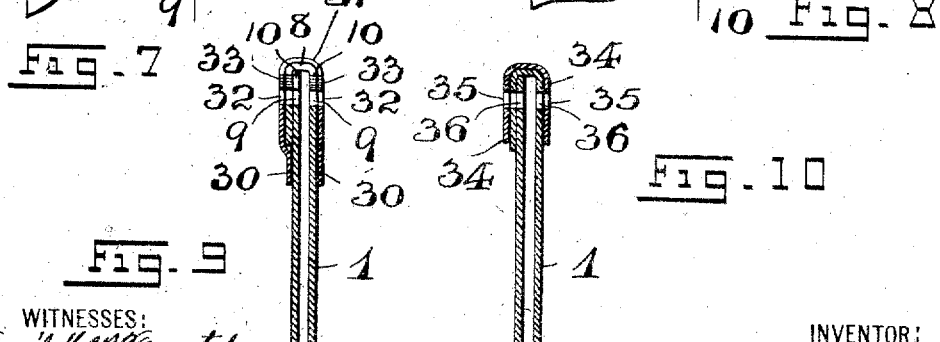

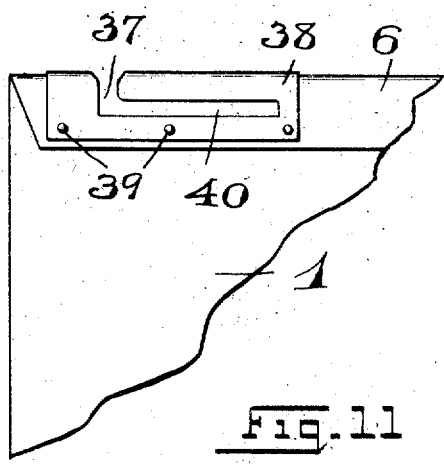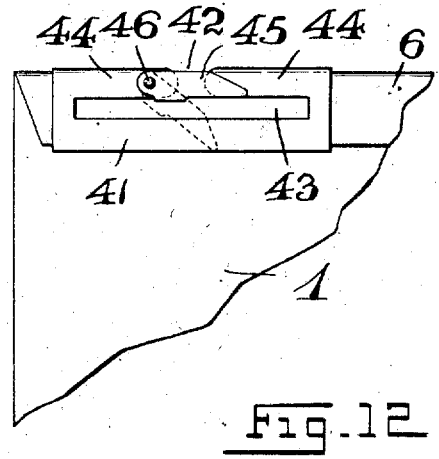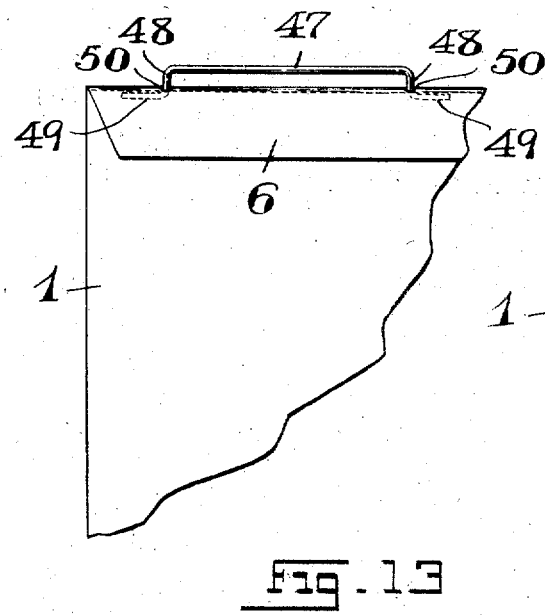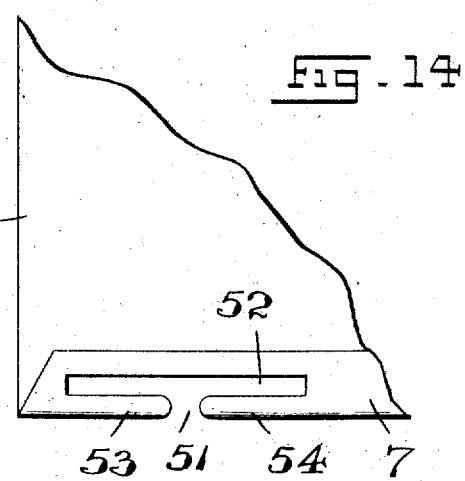

UNITED STATES PATENT OFFICE.

ELLIS S. OLIVER, OF NEWARK, NEW JERSEY.

FILING INCLOSURE OR CASING FOR THE RECORDS OF TALKING-MACHINES.

989,031. Specification of Letters Patent. Patented Apr. 11, 1911.

Application filed February 5, 1910. Serial No. 542,229.

*To all whom it may concern:*

Be it known that I, ELLIS S. OLIVER, a citizen of the United States, residing at Newark, in the county of Essex and State of New Jersey, have invented certain new and useful Improvements in Record-Disk-Filing Inclosures and Cases or Boxes Therefor; and I do hereby declare the following to be a full, clear, and exact description of the invention, such as will enable others skilled in the art, to which it appertains to make and use the same, reference being had to the accompanying drawings, and to characters of reference marked thereon, which form a part of this specification.

This invention has reference, generally, to improvements in filing-inclosures or casings for the records of talking machines, and more particularly to sound-recording and reproducing machines in which the records used are in the form of flat disks; and, the invention relates, more particularly, to a novel filing inclosure or casing for record-disks, and also to a novel filing-case or cabinet for such filing-inclosures.

The invention has for its principal object to provide a novel, neat and simply constructed filing-inclosure or casing for disk-records of talking and other sound-recording and reproducing machines, which can be conveniently handled for removing the record from the filing-inclosure, casing, or envelop, without disturbing generally the position of the said inclosure, casing, or envelop, within a filing-box or cabinet, or upon a shelf, or other fixture in a store, after the removal of the disk, so that the disk after its use can be easily and quickly replaced, and the filing inclosure, casing or envelop moved into its normal initial position.

The invention has for its further object to provide a novel form of filing-case or box, of the general construction and arrangement of parts, as hereinafter more fully specified, so that the case or box can be opened, for access to the filing-inclosures, casings or envelops, without generally obstructing to view the front face or faces of other filing-cases or boxes which may be placed upon a shelf either above or below the filing case or box to which access is desired.

The invention has for its further object to provide in connection with a filing-inclosure, casing or envelop and with a filing-cabinet, case or box therefor, means which will permit a sliding movement of the filing-inclosure, casing or envelop within the cabinet, case or box, so that the filing-inclosure, casing or envelop may be partially extended from the opened front of the filing-cabinet, case or box; but, said means serving as a stop to arrest the sliding movement of said filing-inclosure, casing or envelop and prevent its entire removal from the said filing-cabinet, case or box.

Other objects of this invention not at this time more particularly enumerated will be clearly understood from the following detailed description of the present invention.

With the various objects in view, the invention consists, primarily, in the novel filing-inclosure, casing or envelop, and filing case or box therefor, for the records of talking-machines, and similar sound-recording and reproducing machines, as hereinafter set forth; and, the invention consists, furthermore in the novel arrangements and combination of the various devices and parts, described in the following specification, and then finally embodied in the clauses of the claim which are appended to and which form an essential part of the said specification.

The invention is clearly illustrated in the accompanying drawings, in which:—

Figure 15:
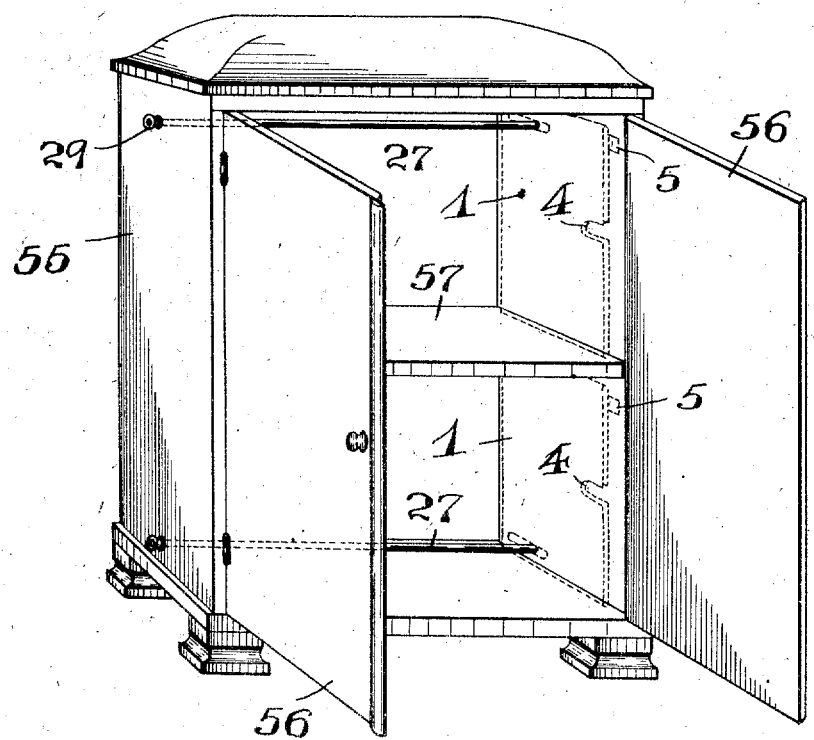

Figure 1 is a perspective view of a filing-case or box, and a plurality of record-disk filing-inclosures or envelops, showing one arrangement of the principles of the present invention. Fig. 2 is a transverse vertical section of the filing-case or box, and a face view of a record-disk filing-inclosure or envelop slidably arranged therein, said view illustrating in connection therewith, and in cross-section, one form of inclosure or envelop-arresting means, and showing within the filing-inclosure or envelop one arrangement of the record-disk; and Fig. 3 is a vertical cross-section, taken on line 3—3 in said Fig. 2, looking in the direction of the arrow *x*, the filing-inclosure or envelop and the record-disk, however, being omitted from said view. Fig. 4 is a detail vertical section, taken on line 4—4 in said Fig. 3, looking in the direction of the arrow *y*; and Fig. 5 is a similar vertical section, taken on line 6—6 in said Fig. 3, looking in the direction of the arrow *z*. Fig. 6 is a transverse vertical section of the upper portion of a filing-case or box provided with a filing-inclosure or envelop-arresting means of a slightly modified construction, said means being shown in elevation. Figs. 7 and 8 are detail face views of the upper corner-portions of record-disk inclosing or filing inclosures or envelops of slightly modified constructions; Fig. 9 is a vertical cross-section taken on line 9—9 in Fig. 7; and Fig. 10 is a similar section taken on line 10—10 in Fig. 8. Figs. 11, 12 and 13 are detail face views of the upper inner portions of three other modified constructions of record-disk inclosing or filing-inclosures or envelops; and Fig. 14 is a detail view of the lower corner-portion of still another modified construction of filing-inclosure or envelop. Fig. 15 is a perspective view of a filing cabinet comprising a plurality of compartments adapted to receive record-disk inclosing or filing-inclosures or envelops embodying the principles of the present invention, said cabinet being provided with suitably located filing-inclosure or envelop-arresting means, and said view illustrating in dotted outline one arrangement of two of said filing-inclosures or envelops.

Similar characters of reference are employed in all of the above-described views, to indicate corresponding parts.

Referring now to the several figures of the drawings, the reference-character 1 indicates a record-disk filing-inclosure or envelop embodying the principles of the present invention, the same being made of any suitable material, usually stiff Manila paper or other suitable card-board. The said inclosure is folded in such a manner so as to be closed upon all of its edges, but one, as at 2, and the said inclosure or envelop is of such suitable size and shape, so as to receive the usual disk-record 3, such as is used with talking machines and other similar sound-recording and reproducing machines. Along the two marginal edges of the two sides forming the mouth of the inclosure or envelop 1, open or cut-away portions, as 4, may be provided which form a suitable means for grasping the edge of the disk-record 3 when it is desired to remove the same from within said inclosure or envelop 1, as will hereinafter more fully appear. Each filing-inclosure or envelop 1 may also be provided with a suitably disposed index-flap, as 5, which projects from the marginal edge-portion of one of the sides at the mouth of the inclosure or envelop, said flaps being disposed in such a manner, so that the flaps will be arranged one beneath the other when a number of inclosures or envelops 1 are placed side by side, as will be clearly understood from an inspection of Figs. 1 and 2 of the drawings.

As shown in the several figures of the drawings, the filing-inclosure or envelop 1 which is adapted to receive the record-disk has its upper and lower edge-portions 6 and 7 folded preferably in the manner illustrated, so that the said upper and lower edge-portions are reinforced. Referring now to Fig. 2 of the drawings, it will be seen that in the upper left-hand corner, the said inclosure is made with an open part 8 and a horizontally disposed and rearwardly extending slot or opening 9; and, the reference-characters 10 and 11 indicate two guiding and retaining tongues or fingers located directly above said opening or slot 9, substantially as shown.

In Figs. 1 to 6 inclusive, I have shown the disk-record filing-inclosure or envelop 1 used in connection with a filing case or box, also forming part of the present invention, with which a number of such disk record-filing inclosures or envelops are used and stored away therein, in the manner hereinafter more particularly specified. The filing case or box is indicated by the reference-character 12, the box being made of any suitable material, preferably card-board, and its base 13 being preferably strengthened by a reenforcing base-member or element, as 14. This element 14 may, however, be omitted, if desired. As shown more particularly in Fig. 1, the case or box 12 has a flanged cover-portion 15 which extends over the greater portion of the upper part of the box, and is preferably immovably affixed to the box in any suitable manner. The said cover-portion 15, however, has suitably connected therewith, in a hinge-like manner, a cover-section or member 16 which is flanged, as at 17, and is adapted to be raised in the manner of a hinged lid or cover. The front opening of the case or box 12 may be closed by means of suitable doors or members 18 which are connected with the vertical and front marginal edge-portions of the respective sides of the case or box 12 in a hinge-like manner, so that, when the said doors or members 18 are closed, the cover-section or member 16 can be fully closed, with its marginal and downwardly extending flanges 17 embracing the upper portions of parts of the sides of the case or box 12, and also the upper portions of the said closed doors or members 18, so that the latter will be retained in their closed positions. To open the said doors or members 18 all that is necessary is to raise the cover-section or member 16, and the doors or members 18 can be swung into their open positions, so as to permit of the partial withdrawal of one or more of said record-disk filing-inclosures or envelops, to the position clearly shown in said Fig. 1 of the drawings, and in the manner to be presently more fully described. One form of means which may be employed, to arrest the forwardly sliding movements of the said inclosures or envelops 1 is clearly shown in Figs. 3, 4 and 5 of the drawings, and the same consists, essentially, of a bar or rod 19 which has a reduced end-portion 20 which is formed with an enlargement or ball-shaped end-member 21. This end-member 21 is swiveled in a ball and socket fitting 22, of any suitable form and construction, said fitting being suitably secured to the inner face, and upon the upper portion of one of the sides, as 23, of the case or box 12. Suitably secured to the inner face, and upon the upper portion of the other side 24 of said case or box 12, is a supporting member or element 25, which is formed with a receiving portion 26, in which the other free end-portion of said bar or rod 19 is supported and can be readily removed therefrom on account of the swiveled arrangement of the opposite end-portion of said bar or rod 19, as will be clearly evident. From an inspection of Fig. 2 of the drawings, it will be clearly understood, that when the end-portion of the bar or rod 19 is lifted from its supported position within the receiving and retaining portion 26 of the member or element 25, any suitable number of the inclosures or envelops 1 can be arranged upon the bar or rod 19, by having said bar or rod extending into and through the slot or elongated opening 9, see Fig. 2; and, when the end-portion of the bar or rod 19 is again placed in said portion 26, the several inclosures or envelops 1 will be slidably supported within the interior of the case or box 12, the sliding movement, however, of each inclosure or envelop 1 being limited to the length of each slot 9. Thus it will be evident, when the case or box 12 has been opened, as shown in Fig. 1 of the drawings, that any one of said inclosures or envelops can be drawn forward, so as to extend partly from the open front of the case or box 12, and that thereupon the record-disk 3 can be conveniently removed for use from the said partially withdrawn inclosure or envelop 1. After the record-disk has been used, it can be quickly and easily replaced in its former inclosure or envelop, which has been left in its partially withdrawn position in the front of the case or box 12, without any loss of time in hunting for the proper inclosure or envelop, whereupon the latter can be slid back into its former position within the case or box 12, to permit the previously opened doors 18 and the raised cover-section or member 16 to be closed.

Another form of means for arresting the forwardly sliding movements of the record-disk filing-inclosures or envelops is represented in Fig. 6 of the drawings. This means in this instance consists of a rod 27, the two end-portions of which are screw-threaded, as at 28. The said screw-threaded end-portions of said rod extend through suitably disposed holes in the respective sides 23 and 24 of the case or box 12, and upon the projecting ends of said rods are screwed suitably formed nuts 29 which hold the said rod in place in its operative position within the case or box 12; or, when either or both of said nuts are unscrewed allows the said rod to be partially or wholly withdrawn, for the placing of one or more of the inclosures or envelops 1 in their operative positions within the case or box 12, or to permit of such inclosures or envelops to be removed from the rod 27.

If desired, the form of opening 8—9, shown in said Fig. 2 of the drawings, may be reinforced by a strip of flexible material 30, which is arranged over the edge-portion of the inclosure or envelop 1, and has its sides or flaps suitably secured to the opposite sides of the inclosure or envelop 1, preferably by being firmly pasted thereto, as clearly indicated in Figs. 7 and 9 of the drawings. The said reinforcing strip 30, in that case, is made with an open part 31, an elongated opening or slot 32, and the guiding and retaining tongues 33. In lieu of the form of opening 8 and slot 9 shown in said Fig. 2, the inclosure or envelop 1 may be provided with a reinforcing strip 34 having elongated openings 35, the inclosure or envelop being made in its sides with correspondingly formed openings 36 which register with the openings 35, as clearly shown in Figs. 8 and 10 of the drawings.

If desired, the inclosure or envelop may be formed as shown in Fig. 11, with an L-shaped opening 37, the edge-portion of the envelop being embraced by a metal reinforcing strip or element, as 38, which is secured in place by means of pins or rivets 39, as shown, and the element 38 having an L-shaped opening 40 which corresponds to and registers with the opening 37.

In Fig. 12, I have shown the open portions 8 and 9 and the tongues 10 and 11 of the inclosure or envelop 1 reinforced by a metal element, as 41, which is clamped over the edge of the inclosure or envelop 1, the said element 41 being formed with the openings 42 and 43, and two tongues 44, and the opening 42 being adapted to be closed and opened by means of a suitably formed friction clasp, as 45, which is pivotally connected with one of said tongues 44 by means of a pin or rivet 46. The operation of closing and opening said opening 42 for the arrangement or removal of the inclosure or envelop 1 upon or from the bar or rod 19, will be readily understood.

In Fig. 13, I have represented still another means for operatively arranging the record-disk filing-inclosures or envelops in their slidable relation within a case or box provided with the arresting-bar or rod of the general character herein-above specified. In this construction, the peculiarly shaped open portions with which the inclosure or envelop 1 shown in the previously described figures is provided, is dispensed with, and in lieu thereof, an element or member 47, which is made of wire, is provided, the said element or member 47 being made with the right-angled portions 48, from each of which extends laterally a retaining tongue or finger 49. These tongues or fingers 49 are passed through suitably disposed holes or perforations 50 in the marginal and folded-over edge-portion of the inclosure or envelop, and the said tongues or fingers arranged as indicated in the dotted outline in said Fig. 13, and suitably secured in place. Thus, the edge of the inclosure or envelop and the elements or members 47 and 48 provide a means with which the bars or rods 19 or 27 may be used for supporting and limiting the sliding movement of each inclosure or envelop within the case or box 12.

If desired, and as clearly shown in Fig. 14 of the drawings, the filing-inclosure or envelop 1 may be provided in one of its lower corners with an open part 51 and a horizontally disposed and rearwardly extending slot or opening 52 connecting with said open part 51, and being formed with a pair of guiding and retaining tongues or fingers 53 and 54, similar to and for the same purposes as the guiding and retaining tongues or fingers 10 and 11, shown in Fig. 2 of the drawings. Of course, it will be understood, that with these parts made as shown in said Fig. 14, the arresting bars, or rods 19 or 27 are accordingly arranged in the lower portion of the case or box 12, so that each inclosure or envelop 1, with the parts 51, 52, 53 and 54 placed as shown in said Fig. 14, can be operatively arranged upon and in sliding relation with the bars or rods 19 or 27, as will be clearly understood.

While in the foregoing description, I have mentioned the use of my novel form of record-disk filing-inclosure or envelop with a case or box, such as is adapted to be placed upon a shelf, still it will be evident, that my present invention is also applicable to filing or storing-cabinets, known ordinarily as music-cabinets, which are used in various forms of ornate pieces of furniture in the music room. In Fig. 15 of the drawings, I have shown my invention applied to a cabinet of this character. The cabinet is indicated by the reference-character 55, having a pair of doors 56 and the interior of the cabinet being divided by a shelf 57. Extending across the rear portions of the two compartments thus provided are the arresting rods or bars, in this case the bars or rods 27, with which the record-disk filing-inclosures or envelops 1 may be operatively connected, in the manner hereinabove described, and as clearly indicated in dotted outline in said Fig. 15.

From the foregoing description of the present invention, it will be clearly seen, that I have devised a neat and a simply constructed record-disk filing inclosure or envelop, and a case or box, or a cabinet therefor, from which the filing-inclosure or envelop can be but partially withdrawn, to permit of the removal of the record-disk from the inclosure or envelop, and enabling the quick return of the disk into its proper inclosure or envelop.

I am fully aware that changes may be made in the arrangements and combinations of the various devices and parts, as well as in the details of the construction of the same, without departing from the scope of the present invention as set forth in the foregoing specification, and as defined in the clauses of the claim which are appended to the said specification. Hence, I do not limit my present invention to the exact arrangements and combinations of the various devices and parts as described in the said specification, nor do I confine myself to the exact details of the construction of the said parts as illustrated in the accompanying drawings.

I claim:—

1. The combination with a record-disk filing-inclosure, of a case, a rod extending across a portion of said case, said filing-inclosure being provided with a rod-receiving opening into and through which said rod extends for supporting said inclosure in its vertical position and slidably within said case, said opening being adapted to limit the sliding movement of said inclosure.

2. The combination with a record-disk filing-inclosure, of a case, a rod extending across a portion of said case, said filing-inclosure being provided with a rod-receiving opening, and guiding tongues, said opening and tongues coöperating with said rod for supporting said inclosure in its vertical position and slidably within said case, said opening being adapted to limit the sliding movement of said inclosure.

3. The combination with a record-disk filing-inclosure, of a case, a rod extending across a portion of said case, said filing-inclosure being provided with a rod-receiving opening into and through which said rod extends for supporting said inclosure in its vertical position within said case and limiting the sliding movement of said inclosure, and a reinforcing strip embracing a portion of the marginal edge of said inclosure and surrounding said opening, substantially as and for the purposes set forth.

4. The combination with a record-disk filing-inclosure, of a case, a rod extending across a portion of said case, said filing-inclosure being provided with a rod-receiving opening, and guiding tongues, said opening and tongues coöperating with said rod for supporting said inclosure in its vertical position within said case and limiting the sliding movement of said inclosure, and a reinforcing strip embracing a portion of said inclosure and said tongues, and said reinforcing strip surrounding said opening, substantially as and for the purposes set forth.

5. A filing case for the arrangement of record-disk filing-inclosures therein, a rod within said case, said rod having one end portion swiveled upon one of the inner faces of said case, and said rod having its other end-portion detachably connected with the opposite inner face of said case and a record-disk filing-inclosure separably arranged upon said rod.

6. A filing case for the arrangement of record-disk filing-inclosures therein, a rod within said case, said rod having one end-portion swiveled upon one of the inner faces of said case, and said rod having its other end-portion detachably connected with the opposite inner face of said case, a record-disk filing-inclosure separably arranged upon said rod, and means connected with said filing-inclosure for limiting the sliding movement thereof.

7. A record-disk filing-inclosure comprising an envelop formed near one of its edge-portions with a rod-receiving slot.

8. A record-disk filing-inclosure comprising an envelop formed near one of its edge-portions with a laterally extending elongated opening and a second opening extending from said elongated opening to the marginal edge-portion of said envelop.

9. A record-disk filing-inclosure comprising an envelop formed near one of its edge-portions with a laterally extending, elongated opening and a second opening extending from said elongated opening to the marginal edge-portion of said envelop, and a reinforcing strip embracing said edge-portion of the envelop and surrounding the said openings.

In testimony, that I claim the invention set forth above I have hereunto set my hand this 2nd day of February, 1910.

ELLIS S. OLIVER.

Witnesses:
 FREDK. C. FRAENTZEL,
 FREDK. H. W. FRAENTZEL.